No. 765,557. PATENTED JULY 19, 1904.
A. G. COUCH & E. W. CRIM.
HORSE COLLAR.
APPLICATION FILED MAR. 4, 1904.
NO MODEL. 4 SHEETS—SHEET 1.
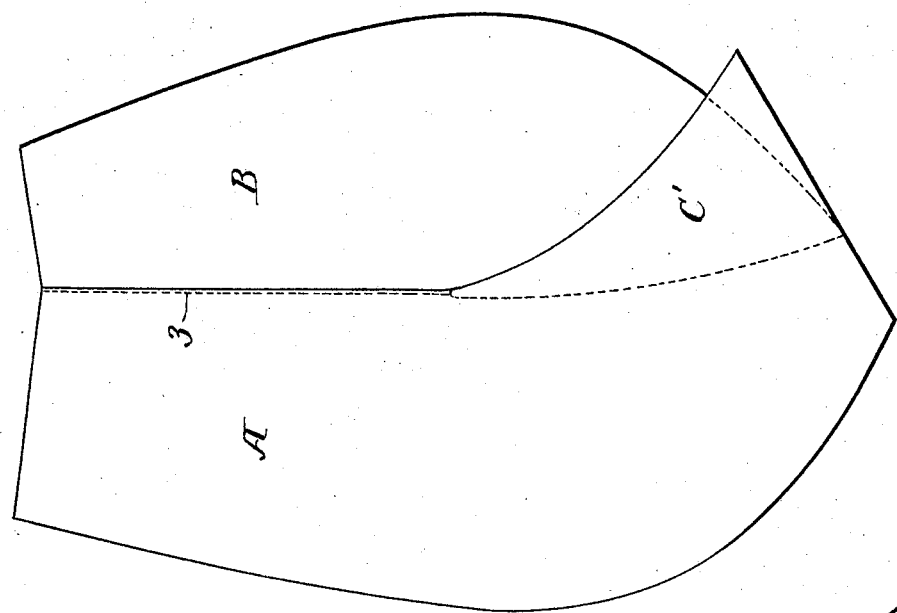
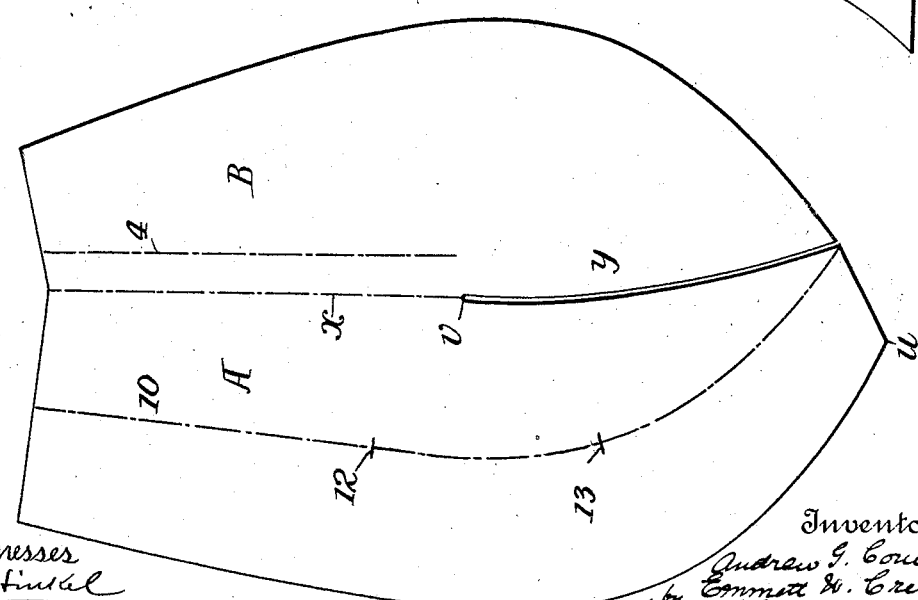

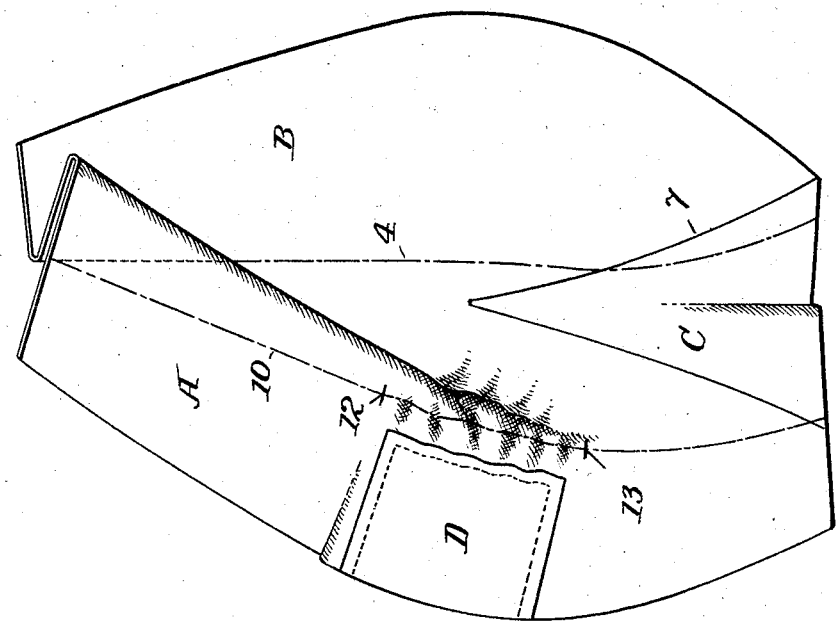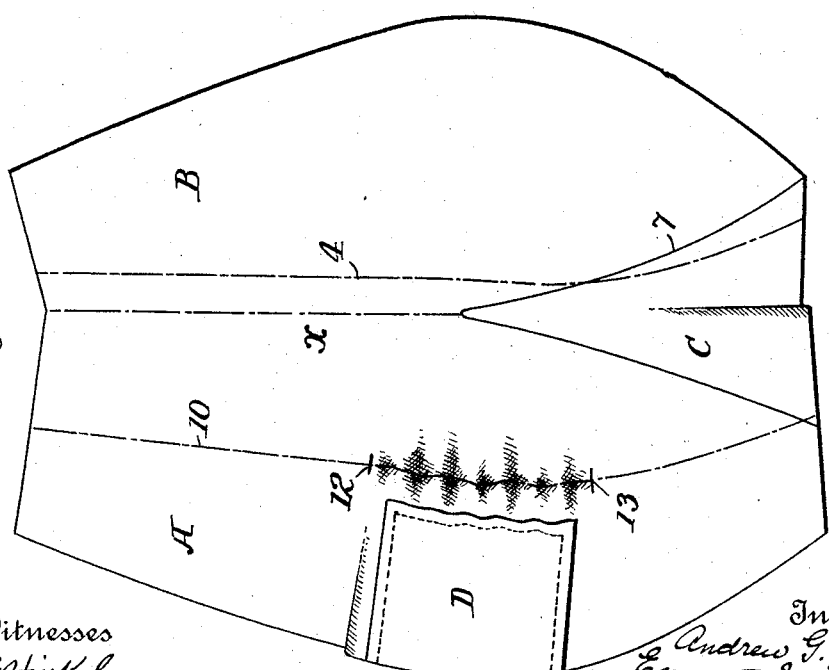

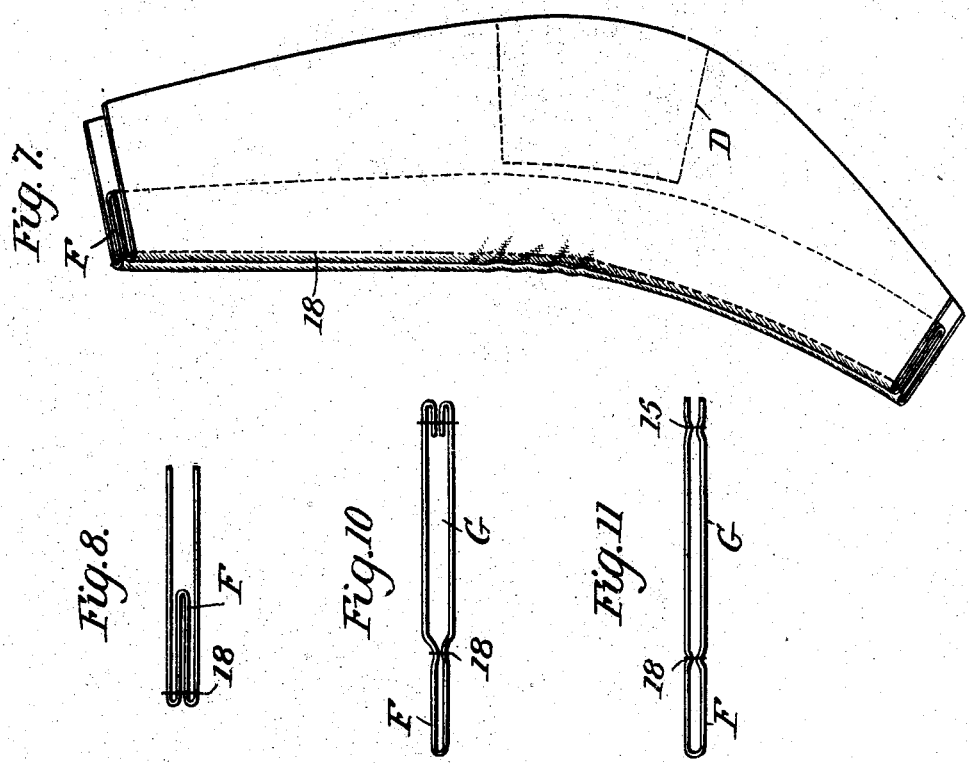
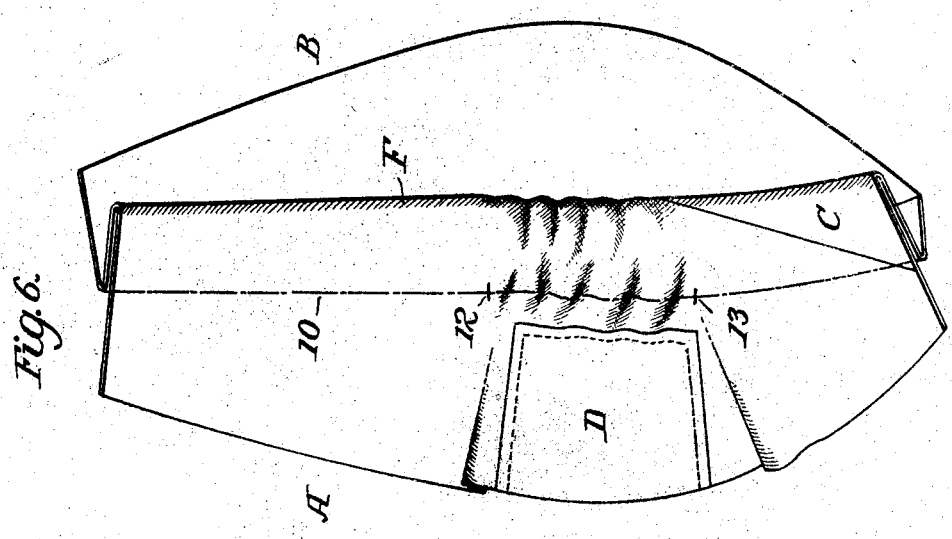

No. 765,557. PATENTED JULY 19, 1904.
A. G. COUCH & E. W. CRIM.
HORSE COLLAR.
APPLICATION FILED MAR. 4, 1904.
NO MODEL. 4 SHEETS—SHEET 4.
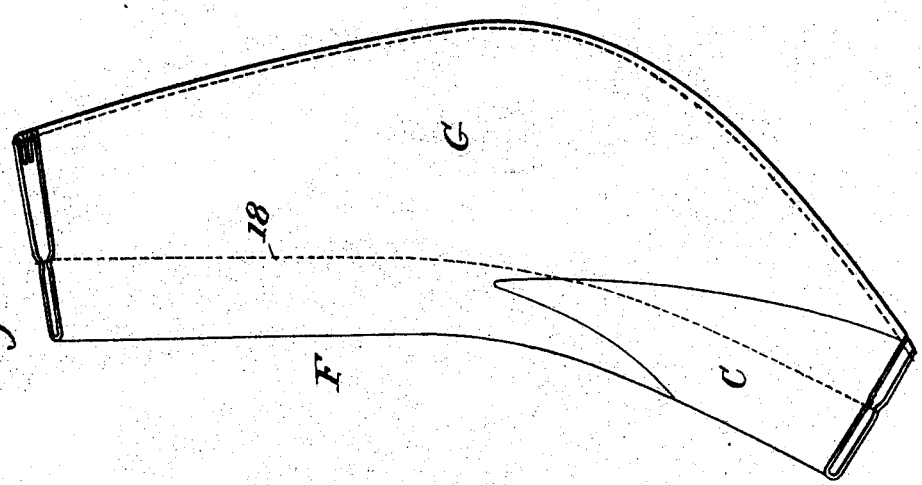
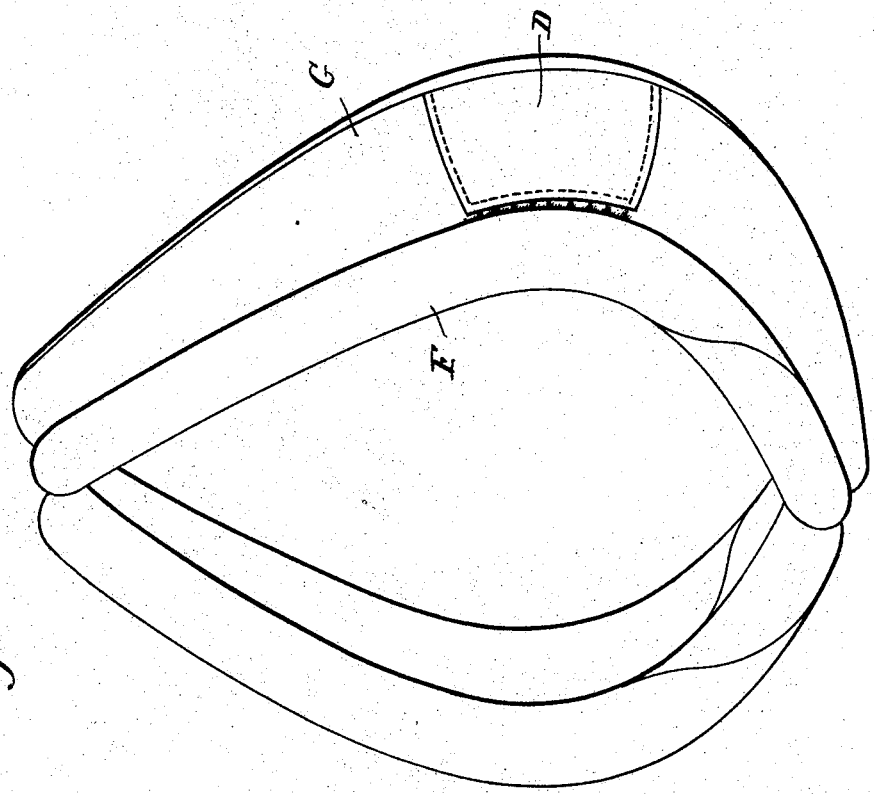
Witnesses
Inventors
Andrew G Couch
Emmett W. Crim
Attorneys No. 765,557.

Patented July 19, 1904.

UNITED STATES PATENT OFFICE.

ANDREW GEORGE COUCH AND EMMETT WATS CRIM, OF MEMPHIS, TENNESSEE, ASSIGNORS TO COUCH BROTHERS AND J. J. EAGAN COMPANY, OF ATLANTA, GEORGIA, A CORPORATION OF GEORGIA.

HORSE-COLLAR.

SPECIFICATION forming part of Letters Patent No. 765,557, dated July 19, 1904.

Application filed March 4, 1904. Serial No. 196,531. (No model.)

*To all whom it may concern:*

Be it known that we, ANDREW GEORGE COUCH and EMMETT WATS CRIM, both citizens of the United States, residing at Memphis, in the county of Shelby and State of Tennessee, have invented certain new and useful Improvements in Horse-Collars, of which the following is a specification.

Our invention relates to horse-collars, and more especially to that character of horse-collars formed of fabric, and has for its object not only to produce the collars more cheaply, but of a much better shape than can be secured by ordinary methods of construction; and to this end our invention consists of a collar in which there are two united sections, with an intervening gore either sewed to or forming part of one of the sections, as fully set forth hereinafter and as illustrated in the accompanying drawings, in which—

Figure 1 is a plan showing the shape of the piece or pieces from which one casing is made. Fig. 2 shows the gore detached. Fig. 3 shows the shape when the gore is cut out in one piece with one of the sections. Fig. 4 illustrates the united sections with the gore sewed in between. Fig. 5 illustrates the sections partly folded or folded only at the top in the formation of the rim. Fig. 6 shows the fold complete. Fig. 7 illustrates one means of folding the strips after the rim portion is sewed. Fig. 8 is an edge view showing the manner of folding illustrated in Fig. 7. Fig. 9 illustrates another mode of sewing to form the rim portion and of folding so as to connect the edges with the seams on the outside. Fig. 10 is an edge view of Fig. 9. Fig. 11 is an edge view showing a preferable mode of folding and sewing, and Fig. 12 is a perspective view of the completed collar.

The collar consists of two side pieces, each of which is formed from a casing properly shaped and containing the usual stuffing material. Each casing consists of two united sections A B, Fig. 1. These sections may be formed from a single strip of cloth, or they may consist of two pieces of cloth united along the line $x$, the effect being the same in both cases, except that by cutting the two sections from a single piece the necessity of sewing along the line $x$ is avoided. The sections A B are cut to the proper shape, gradually swelling outward from the top to near the lower end and then the side edges converging toward a point, and a slit $y$ is made at the lower portion extending from one side of the central point $u$ upward to not quite half the length of the sections to the point $v$, and in this slit is inserted a gore C. Instead, however, of doing this the section A may be cut of the shape shown in Fig. 3, so as to practically include the gore C' in it, and the edge of the section A is then sewed to the section B along the line 3. It is preferable, however, to make use of the gore, because this enables the parts to be properly shaped by means of waste pieces of material from which the gores can be cut, and as thus shaped the casing is of a character to impart a much better shape to the collar than can be otherwise secured, while the cost of manufacture is very much reduced over the cost as heretofore made. After the gore has been inserted, either in the shape of a separate piece or by cutting the section A, as shown in Fig. 3, the parts will occupy the position shown in Fig. 4, a leather piece D being put in proper position to form the chafe. A line 10 is then drawn on the section A parallel to the edge of this section, and this section is then puckered or drawn between the points 12 and 13 for a purpose described hereinafter. Another line 4 is drawn along the section B from the top downward for part of the distance and is then carried to the left across the seam 7 of the gore, and one piece is folded over the other, and the two are sewed together along the lines 10 and 4. It will of course be understood that the lines 10 and 4 need not be absolutely drawn upon the sections, although this would be preferable in many cases, it being sufficient if the one piece is folded over on the other—as, for instance, shown in Fig. 9—and then sewed through. Instead of being sewed through from one section to the other, as shown in Fig. 9, it may be first folded as shown in Fig. 10 and then a part of each section turned so as to inclose a shorter fold, as shown in Fig. 7, and the two parts may be sewed together along the line 18. Whichever mode of folding and sewing may be employed the result is that a rim-section F is formed which when stuffed forms the rim of the collar on this section thereof.

After the parts have been folded and sewed to form the rim-sections of the casing the edges of the sections A B must be sewed together. These edges may be turned in and sewed, as in Figs. 9 and 10, in which case it will not be necessary to turn the casing. Preferably, however, it is desirable to bring the seams inside the casing, in which case after sewing the seam which forms the rim-section the sides are brought together, as shown in Fig. 11, and are then sewed together on the line 15, after which the casing is turned, bringing the seams all to the inside. It is then stuffed, when each section of the collar will present the appearance shown in Fig. 12, the rim portion F being substantially of uniform diameter, while the hame portion or main portion G will be much better proportioned and afford a much easier and better fit than can be formed in the usual way. When thus formed, it will be found that the puckered portion between the points 12 and 13 is at the curved portion of the collar and that it takes up all the surplus material, so that the surfaces of the parts F and G are smooth and regular.

Without limiting ourselves to the construction shown, we claim—

1. A collar-casing having connected sections with an intermediate V-shaped gore, substantially as set forth.

2. A collar-casing having two sections with an intermediate gore, folded and stitched about midway between the edges to form the rim portion and connected at the edges to form the hame portion, substantially as set forth.

3. A collar-casing having a rim portion of substantially uniform width and a hame portion decreasing in width toward each end, and consisting of two connected sections and an intermediate gore at the lower portion, substantially as set forth.

4. A collar-casing having a rim portion of substantially uniform width and a hame portion decreasing in width toward each end, and consisting of two connected sections and an intermediate gore at the lower portion, the adjacent parts of the rim and hame sections being gathered adjacent to the point where they are curved, substantially as set forth.

5. A collar-casing consisting of two connected sections and intermediate gore infolded and stitched parallel to the edge of the infold, and stitched together at the edges with the seams inside, substantially as set forth.

6. A collar-casing consisting of connected sections having near one end separated edges and an interposed gore, and folded intermediate the edges and stitched to form a rim portion of substantially uniform width, and the edges brought together and stitched, substantially as set forth.

7. A collar-casing consisting of connected sections having near one end separated edges and an interposed gore, and folded intermediate the edges and stitched to form a rim portion of substantially uniform width, and the edges brought together and stitched with the seam inside, substantially as set forth.

In testimony whereof we have signed our names to this specification in the presence of two subscribing witnesses.

ANDREW GEORGE COUCH.
EMMETT WATS CRIM.

Witnesses:
  G. W. MOORE,
  GEO. HARSH.